United States Patent [19]
Fillon et al.

[11] Patent Number: 5,169,232
[45] Date of Patent: Dec. 8, 1992

[54] TORQUE LIMITING DEVICE FOR DRIVING MEMBERS OF A MIXING CENTER FOR PAINTS AND LIKE PRODUCTS

[75] Inventors: Daniel Fillon, Yvelines; Michel Lesimple, Nogent Le Roi, both of France

[73] Assignee: Fillon-Pinchon S.A., France

[21] Appl. No.: 635,678

[22] Filed: Dec. 28, 1990

[30] Foreign Application Priority Data

Jun. 11, 1990 [FR] France ............................ 90 07221

[51] Int. Cl.$^5$ .............................................. F16D 7/00
[52] U.S. Cl. ................................. 366/249; 366/605; 464/38; 192/56 R
[58] Field of Search ............... 366/605, 242, 244, 245, 366/247, 248, 249, 251, 279; 403/256, 257, 261; 464/38, 901; 254/368; 192/56 R

[56] References Cited

U.S. PATENT DOCUMENTS

| | | | |
|---|---|---|---|
| 2,083,037 | 6/1937 | Schmittgen | 464/38 |
| 2,429,091 | 10/1947 | Dodge | 464/38 |
| 2,603,461 | 7/1952 | Marienthal | 366/251 |
| 2,669,833 | 2/2954 | Hill | 464/38 |
| 2,716,875 | 9/1955 | Hill | 464/38 |
| 2,802,649 | 8/1957 | Stockton | 366/605 |
| 2,965,363 | 12/1960 | Worden | 366/605 |
| 3,930,382 | 1/1976 | Timtner | 464/38 |
| 4,968,175 | 11/1990 | Hamblin | 403/261 |

FOREIGN PATENT DOCUMENTS

| | | | |
|---|---|---|---|
| 2951731 | 7/1980 | Fed. Rep. of Germany | 366/605 |
| 1252439 | 11/1971 | United Kingdom | 464/38 |

*Primary Examiner*—Philip R. Coe
*Assistant Examiner*—Randall Edward Chin
*Attorney, Agent, or Firm*—Larson & Taylor

[57] ABSTRACT

Driving member of the mixing centers are driven permanently by a transmission element for driving a coupling member with which a complementary coupling member of a stirring pot is brought in engagement. Each driving member comprises a pulley connected to the driving shaft of a coupling member by a resilient means associated with protrusions interposed between the shaft and the pulley, said protrusions disconnecting the shaft from the pulley when there is a unacceptable excess of a retaining torque applied to the coupling member.

16 Claims, 3 Drawing Sheets

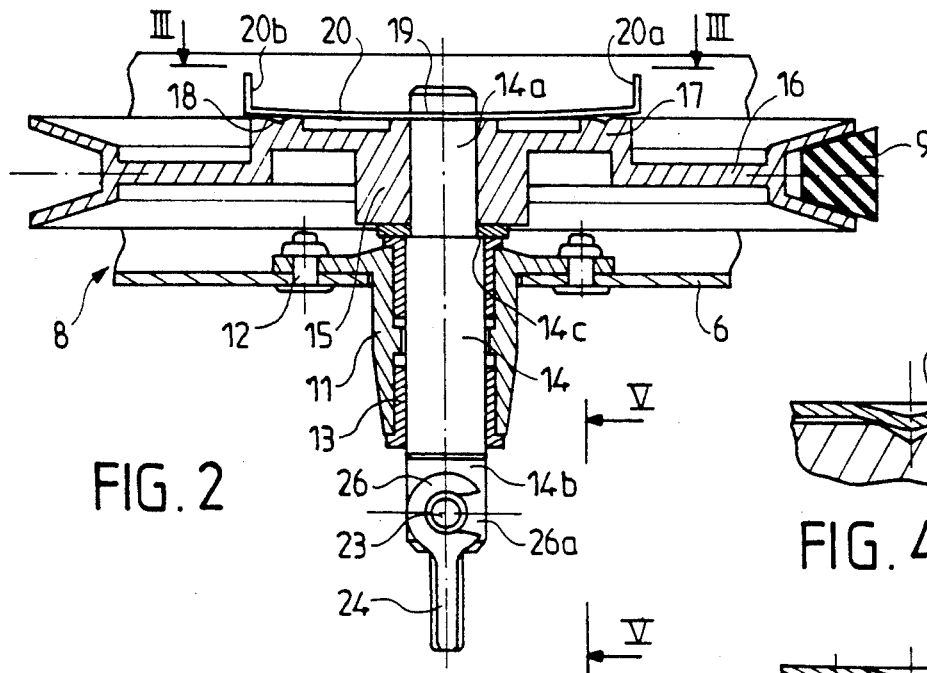
FIG. 2
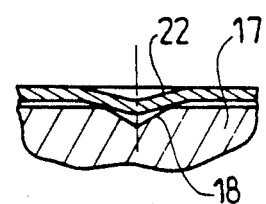
FIG. 4
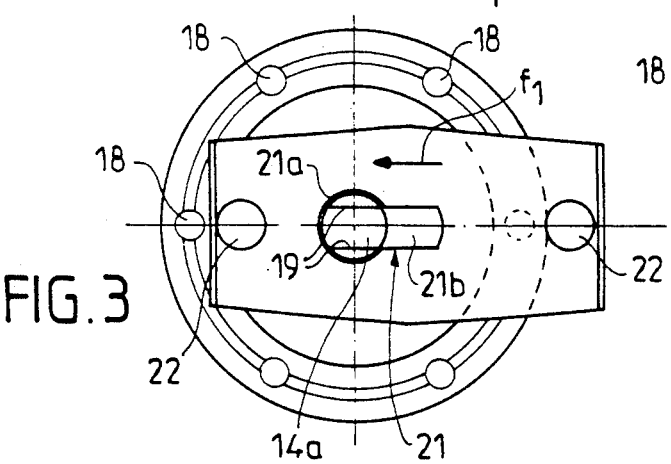
FIG. 3
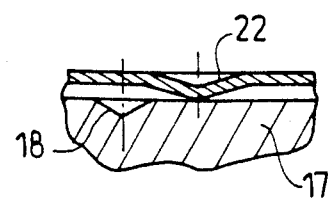
FIG. 4a
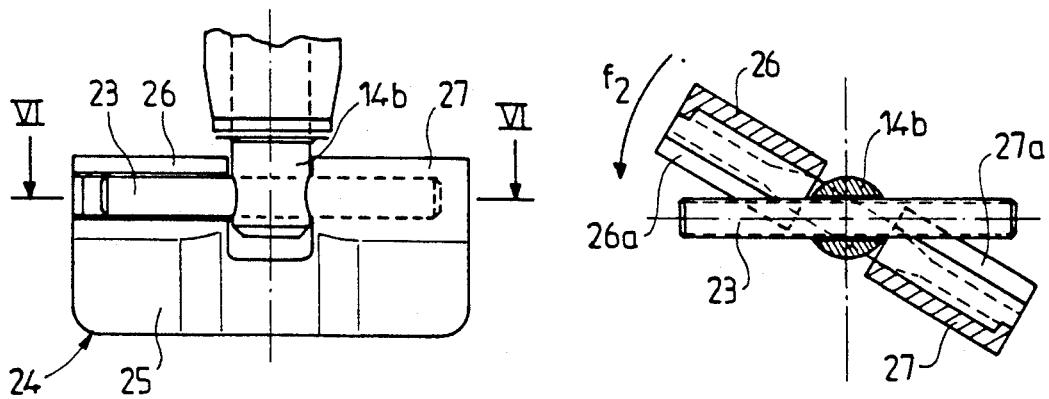
FIG. 5
FIG. 6

TORQUE LIMITING DEVICE FOR DRIVING MEMBERS OF A MIXING CENTER FOR PAINTS AND LIKE PRODUCTS

BACKGROUND OF THE INVENTION

This invention relates to mixing centers for paints and like products. These mixing centers are now preferred in the form of cabinets made of vertically superimposed modules Moreover, several cabinets can be linked horizontally.

Each module of each cabinet includes coupling members protruding from the upper wall and which are permanently driven so as to enable an immediate entrainment of stirrers of pots containing the paint or like products, and the, lid of which is provided with a complementary coupling element brought in engagement with one of the coupling members which are permanently rotating.

It is important that damages cannot occur when a stirrer pot is put in position or removed from a module of the mixing center, and it is still more important that the coupling members which rotate permanently cannot be at the origin of corporal casualties.

OBJECT OF THE INVENTION

The invention has for its object to solve the hereabove stated problem by providing a new torque limiting device that ensures simultaneously an assembly of the permanently or continuously rotating driving members and coupling members of the mixing center;

SUMMARY OF THE INVENTION

According to the invention, in a torque limiting device for a driving member of a mixing center for paints and like products, in which driving members are driven permanently by a transmission element for driving, a coupling member with which a complementary coupling member of a stirring pot is brought into engagement, each driving member comprises a pulley connected to the driving shaft of a coupling member by a resilient means associated with protrusions interposed between the shaft and the pulley, whereby these protrusions disconnect the shaft from the pulley when there is an unacceptable excess of the retaining torque applied to the coupling member.

Various other features of the invention will become more apparent from the following detailed description.

BRIEF DESCRIPTION OF THE DRAWINGS

Embodiments of the invention are shown, by way of non limiting examples, in the accompanying drawings, wherein :

FIG. 2 is a cross sectional view of one of the driving members included in the modular center of FIG. 1.

FIG. 3 is a view taken along line III—III of FIG. 2.

FIGS. 4 and 4a are enlarged cross sectional views illustrating two characteristic positions of members shown in FIGS. 2 and 3.

FIG. 5 is a side elevation view taken substantially along line V—V of FIG. 2.

FIG. 6 is a cross sectional view taken along line VI—VI of FIG. 5 showing a characteristic position.

DESCRIPTION OF PREFERRED EMBODIMENTS

Figure 1:
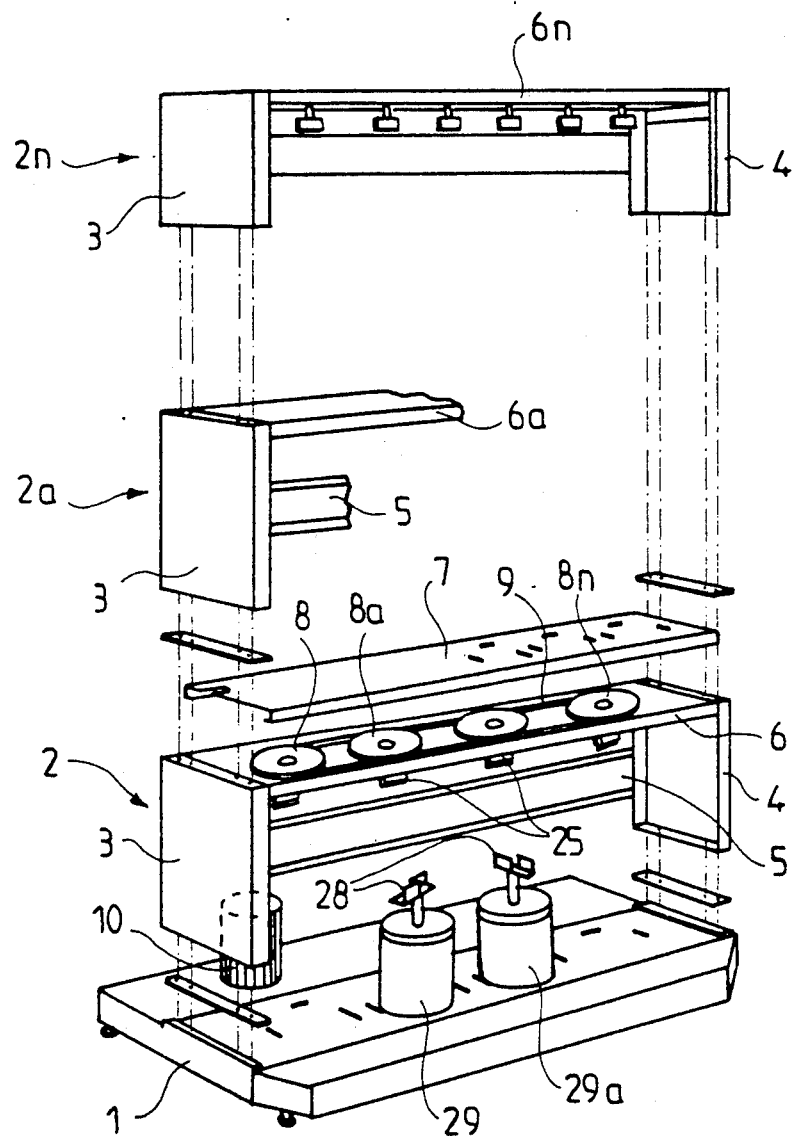
FIG. 1 is a partial exploded perspective view of a mixing modular center for paints and like products, using the device.

Referring now to the drawings,

FIG. 1 shows the essential or basic components of a mixing modular center. This center comprises a base 1 for supporting superimposed modules 2, 2a, . . . 2n. Each module 2, 2a, . . . 2n comprises two side panels 3, 4, preferably hollow panels connected by crosspieces 5 placed on one side only. Moreover, the panels 3, 4 are connected at their upper portion by a casing 6 adapted to be closed by a lid 7, the top of which will form a base for an adjacent module.

Each casing 6 comprises a set of driving members 8, 8a, . . . 8n the number of which depends of the length of the casings 6. The driving members 8, 8a, . . . 8n are connected, amongst other things, by a transmission element 9, for example a belt or a chain, or still any other like means known in the art.

The driving members 8, 8a, . . . 8n of the various casings 6, 6a, . . . 6n are in turn driven by an electric motor 10 which can be mounted on the base 1 as shown in FIG. 1, or in any other position including for example on top of the lid 7 of the last casing 6n, this motor 10 being connected to the driving members 8, 8a, . . . 8n by a transmission which is not shown since this transmission can be made of many means known in the art.

FIGS. 2 to 6 show a first embodiment of a driving member with a torque limiter according to the invention.

The driving member comprises a bearing cage 11 connected with the bottom of the casing 6 by fixation members 12. The bearing cage 11 contains bushes 13 for a shaft 14, one end 14a of which extends through a hub 15 of a pulley 16 in the groove of which passes the hereabove described transmission element 9.

The top of the hub 15 defines a ring 17 having a top which is formed with blind holes 18 or other recesses which are advantageously placed so as to be diametrically opposite to each other, two by two. The end 14a of shaft 14 is formed, just above its portion extending beyond the hub 15, with cuts 19 which are shown diametrically opposite in FIG. 3. The cuts 19 extend preferably at a level which is slightly lower than the top of the ring 17.

A resilient blade 20, the ends 20a, 20b of which are cambered are formed in its median portion with an opening 21 in the shape of the keyhole, meaning that the opening 21 has a circular portion 21a with a diameter corresponding to that of the end 14a of the shaft 14, and a substantially rectangular portion 21b the width of which corresponds to portion of the end 14a of the shaft 14 which extends between the bottom of the cuts 19.

Adjacent its ends, the resilient blade 20 is formed with protrusions 22, for example bosses For mounting the shaft 14, the only thing to do is to engage the shaft inside the bushes 13, then inside the hub 15 of the pulley 16, and thereafter to put in position the resilient blade 20 by engaging the protruding end 14a inside the circular portion of the resilient blade 20.

By sliding the resilient blade 20 in direction of the arrow f1 in FIG. 3, the portion 21b is introduced inside the cuts 19, the result of which being to connect the shaft 14 axially with the blade 20, while this shaft is in turn angularly fixed to the blade 20 which forms a key.

By providing the cuts 19 at a level slightly lower than the top of the ring 17, and by having the end 14a of the shaft 14 of a smaller diameter, the result is that the hub 15 of the pulley 16 is retained against the shoulder 14c of the shaft 14, and that the blade 20 applies a constant pressure on top of the ring 17.

The protrusions 22 of the blade 20 are normally engaged inside the blind holes or other recesses 18, so that a rotary movement imparted to the pulley 16 is transmitted to the shaft 14 by the blade 20; the torque which can be transmitted being however dependent on the pressure applied by the resilient blade 20 on the ring 17 and also dependent on the shape and sizes of the protrusions 22 and of the blind holes 18 or other recesses.

A second end 14b of the shaft 14 is provided, as shown in FIGS. 5 and 6, with a tranverse spindle 23 on which is mounted, and preferably snapped in, a coupling member 24 including a vane 25 extending below two axial opened sleeves 26, 27, the opening 26a, 27a of which having a height which is slightly less than a diameter of the spindle 23. In this manner, the mounting of the coupling member 24 is carried out as shown, meaning that it is brought at the level of the spindle 23 while forming an angle with the spindle 23 since it is rotated in direction of the arrow f2 in order that both sides of the spindle 23 will extend by a snap-in engagement in the sleeves 26, 27.

Each coupling member 24 (FIG. 1) is adapted for cooperating with a complementary coupling member 28 carried by stirring pots 29, 29a, ... supported by the base 1, or by the base forming portion of the lids 7 of the superimposed modules.

As shown from the preceding description, when the coupling members 24 of a driving member 8 are in engagement with a complementary coupling element 28 of a stirrer pot 29, this being obtained by sliding the stirrer pot 29 o a chosen base 7, the complementary coupling member 28 is automatically driven since all the driving members 8 of the modular center rotate permanently.

If for some reason, the complementary coupling element 28 of a stirrer pot is not correctly in position or if, inadvertently, a foreign body comes in contact with the coupling member 24 of one of the driving members 8, then the torque limiter formed by the resilient blade 20 comes in action, meaning that the protrusion or protrusions 22 will come out from the blind hole or holes 18 of the pulley 16 which is still driven without the shaft 14 being able to continue rotating.

As soon as the reason which has caused the disengagement of the resilient blade 20 has ceased, the protrusions 22 extend again inside the set of blind holes 18, and the driving of the shaft 14 as well as that of the coupling member 24 is started again.

Figure 7:
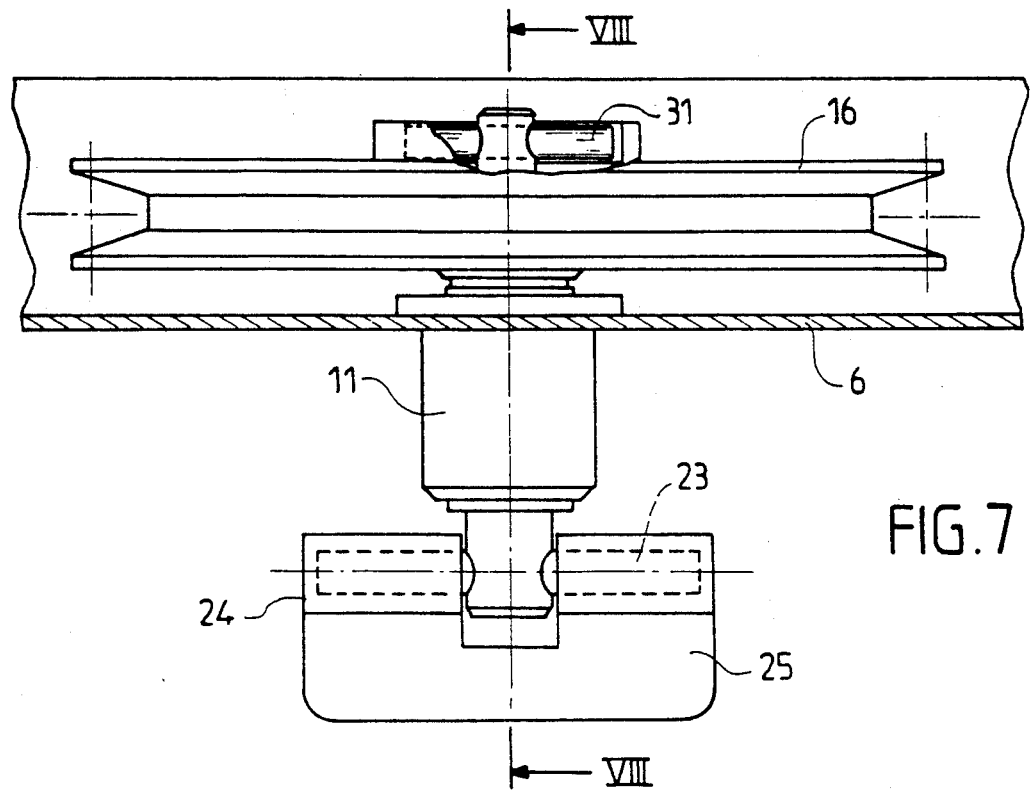
FIG. 7 is an elevation view of a variant of the driving members of FIG. 2.
Figure 8:
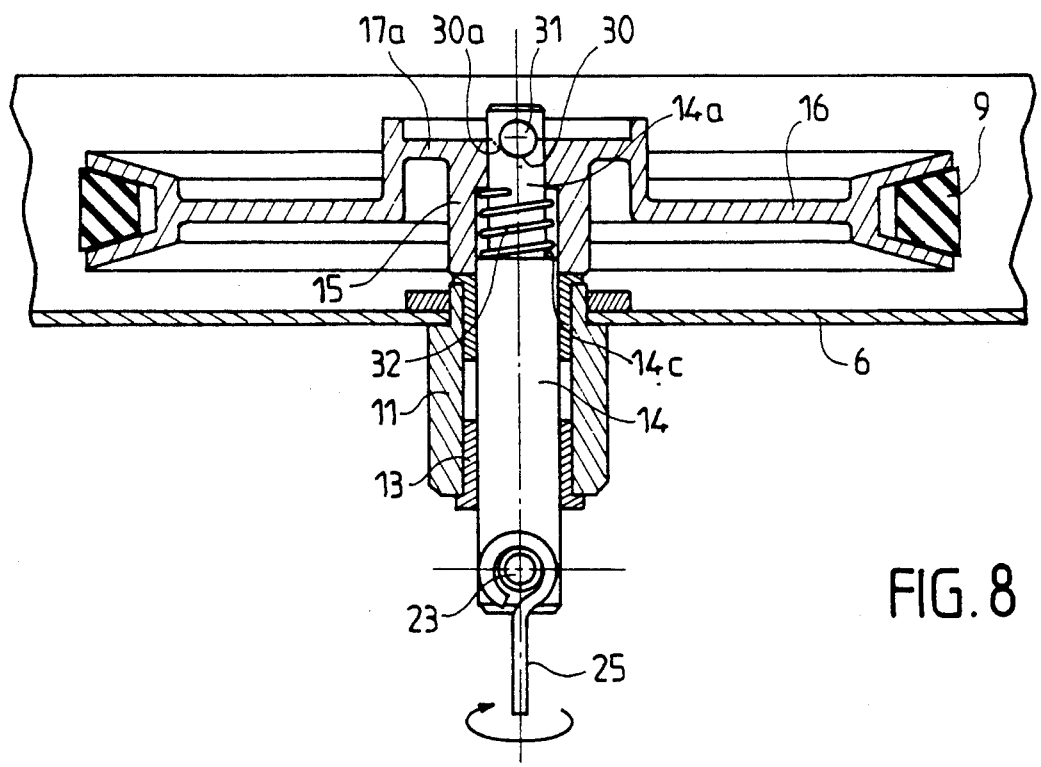
FIG. 8 is a cross sectional view taken along line VIII—VIII of FIG. 7.

FIGS. 7 and 8 show a variant according to which the hub 15 of the pulley 16 forms a ring 17a provided with at least one set of notches 30 with a slanting edge 30a.

In the embodiment of FIGS. 7 and 8 the smaller diameter end 14a of the shaft 14 is provided with protrusions 31 made for example by a throughgoing spindle, and a compression spring 32 is interposed between the shoulder 14b and pulley 16.

The driving of the pulley 16 is provided as previously by the belt 9. If an excessive torque is then applied to the coupling member 24, the spindle 31 will slide along the slanting edge 30a of the notch 30 and thereby will come atop the ring 17a, thereby slightly compressing the spring 32 which fulfills the same function as the resilient blade 20 previously described.

As soon as the spindle 31 has come out from the notch 30, the driving of the shaft 14 is interrupted, but is immediatly started again as soon as the disturbance which has caused the abnormal increase of the torque has ceased.

The invention is not limited to the embodiments shown and described in detail and various modifications can be carried out without departing from the scope of the invention as shown by the claims. In particular, the protrusions 22 can be made of a multiplicity of pins and at the limit by a friction surface.

We claim:

1. A mixing arrangement for stirring pots of paint and like products, said mixing arrangement comprising a single motor unit, a plurality of driving assemblies operatively connected to said single motor unit so as to be driven thereby, each of said driving assemblies comprising a pulley, a plurality of coupling members each including a driving shaft, a plurality of complementary coupling elements driven by said coupling member and engaging said pots, and a plurality of torque limiting devices, one of said torque limiting devices being interposed between the pulley of each driving assembly and the driving shafts of the corresponding coupling members of that driving assembly for controlling transmission of torque from said pulley to each said shaft, each of said torque limiting devices comprising a resilient means, including protrusions interposed between the associated shaft and pulley, for disconnecting that shaft from the associated pulley when there is an unacceptable excess of retaining torque applied to the corresponding coupling member, said resilient means comprising a resilient blade member selectively connectable to the associated shaft and having said protrusions formed thereon, said blade member bearing resiliently on a ring including blind holes formed on the associated pulley and said blade member being movable between an inoperative position wherein the blade member is disconnected from the associated shaft so that the associated shaft is disconnected form the corresponding pulley and an operative position wherein the blade member engages said shaft and said protrusions engage in said blind holes.

2. The device as set forth in claim 1, wherein said resilient blade member is formed with an opening in the shape of a keyhole, and having a rectangular portion which is engaged inside cuts formed on said shaft.

3. The device as set forth in claim 2, wherein said shaft includes a shoulder and the cuts are formed in a portion of smaller diameter of the shaft and extend at a level which is lower than that of said ring, whereby, in the operative position thereof, said blade member is resiliently deformed and maintains said shoulder of the shaft against the pulley.

4. The device as set forth in claim 1, wherein the resilient blade member is formed with two protrusions comprising bosses for engaging the blind holes formed in the pulley in positions in which said blind holes are diametrically opposite.

5. The device as set forth in claim 1, wherein the protrusions are formed by a spindle extending through a portion of smaller diameter of the shaft, said spindle being maintained by a compression spring inside slanting edge notches of the pulley.

6. The device as set forth in claim 1, wherein each shaft is maintained inside bushes of a bearing cage fixed to a casing of the mixing arrangement by the corresponding torque limiter device.

7. The device as set forth in claim 1, wherein the shaft has a free end, said free end comprising a tranverse spindle engaged inside open sleeves of a coupling member.

8. The device as set forth in claim 7, wherein the transverse spindle of said free end of the shaft is snapingly retained inside said open sleeves.

9. A mixing arrangement for stirring pots of paint and like products, said mixing arrangement comprising a single motor unit, a plurality of driving assemblies operatively connected to said single motor unit so as to be driven thereby, each of said driving assemblies comprising a pulley, a plurality of coupling members each including a driving shaft, a plurality of complementary coupling elements driven by said coupling member and engaging said pots, and a plurality of torque limiting devices, one of said torque limiting devices being interposed between the pulley of each driving assembly and the driving shafts of the corresponding coupling members of that driving assembly for controlling transmission of torque from said pulley to each said shaft, each of said torque limiting devices comprising a resilient means, including protrusions interposed between the associated shaft and pulley, for disconnecting that shaft from the associated pulley when there is an unacceptable excess of retaining torque applied to the corresponding coupling member, said resilient means comprising a resilient blade member selectively connectable to the associated shaft and movable between an inoperative position wherein the blade member is disconnected from the associated shaft so that the associated shaft is disconnected from the corresponding pulley and an operative position wherein the blade member engages said associated shaft and wherein said associated shaft can be disconnected from the associated pulley when there is an unacceptable excess of retaining torque applied to the corresponding coupling member.

10. The device as set forth in claim 9, wherein said pulley includes a plurality of recesses formed therein and said protrusions engage in a pair of said recesses when said blade member is in the operative position thereof.

11. The device as set forth in claim 10, wherein said resilient blade member is formed with an opening in the shape of a keyhole, and having a rectangular portion which is engaged inside cuts formed on said shaft in the operative position of said blade member.

12. The device as set forth in claim 11, wherein said shaft includes a shoulder, wherein said recesses are included in a ring formed on said pulley, and wherein the cuts are formed in a portion of smaller diameter of the shaft and extend at a level which is lower than that of said ring, whereby, in the operative position thereof, said blade member is resiliently deformed and maintains said shoulder of the shaft against the pulley.

13. The device as set forth in claim 10, wherein the resilient blade member is formed with two protrusions comprising bosses for engaging the recesses formed in the pulley in positions in which said recesses are diametrically opposite.

14. The device as set forth in claim 9, wherein each shaft is maintained inside buses of a bearing cage fixed to a casing of the mixing arrangement by the corresponding torque limiter device.

15. The device as set forth in claim 9, wherein the shaft has a free end, said free end comprising a transverse spindle engaged inside open sleeves of a coupling element.

16. The device as set forth in claim 15, wherein the transverse spindle of said free end of the shaft is snapingly retained inside said open sleeves.

* * * * *